Dec. 8, 1936.　　　　E. S. HEMMERLY　　　2,063,502
SHADING LENS
Filed Dec. 15, 1933
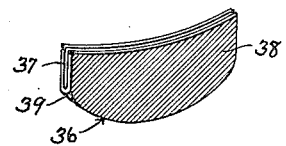
Earl S. Hemmerly
Inventor
By H. W. Williamson
Attorney.

Patented Dec. 8, 1936

2,063,502

UNITED STATES PATENT OFFICE 2,063,502

SHADING LENS

Earl S. Hemmerly, Philadelphia, Pa.

Application December 15, 1933, Serial No. 702,466

2 Claims. (Cl. 88—41)

My invention relates to a new and useful shading lens and has for its object to provide means for attachment to a pair of eyeglasses, having either optic or non-optic lenses, to protect the wearer's eyes from bright or glaring lights and direct or reflected sun rays.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which;—

The figure is a perspective view of a shading lens embodying my invention.

In carrying out my invention as herein embodied 36 represents the shading lens which is of segmental formation and is fashioned from suitable material, for instance, glass, celluloid or part glass and part celluloid, to produce a U-shaped partial cover for the spectacle lens.

Said protective lens 36 includes substantially parallel walls 37 and 38 joined by an end wall 39 and these may be formed integral or separate parts secured together in some well known or desired manner. Either one or both of the walls 37 and 38 may be colored so long as the finished product is transparent. Such a lens may be placed on the bottom or top of a spectacle lens and by making the walls 37 and 38 convergent toward the edge opposite the wall 39 they may be sprung apart to place the protective lens in position which will produce sufficient friction on the spectacle lens to hold said protective lens in place.

Of course I do not wish to be limited to the exact details of construction herein shown and described as these may be varied within the scope of the appended claims without departing from the spirit of my invention.

Having thus described my invention, what I claim is:

1. A shading lens of segmental formation U-shaped in cross-section so as to be slipped over another lens leaving a portion of the latter uncovered and providing two members one of which is of clear transparent and the other of colored transparent material.

2. A shading lens of segmental formation U-shaped in cross section thereby providing two spaced apart identical members and adapted to be slipped over another lens leaving a portion of the latter entirely uncovered and unobstructed, said members being transparent and at least one of them colored.

EARL S. HEMMERLY.